(12) United States Patent
Burbank (10) Patent No.: US 12,501,856 B2
(45) Date of Patent: Dec. 23, 2025

(54) HARVESTER WITH TANK EXPANSION

(71) Applicant: CLAAS Selbstfahrende Erntemaschinen GmbH, Harsewinkel (DE)

(72) Inventor: Martin Burbank, Warendorf (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 810 days.

(21) Appl. No.: 17/747,227

(22) Filed: May 18, 2022

(65) Prior Publication Data
US 2022/0369555 A1 Nov. 24, 2022

(30) Foreign Application Priority Data

May 19, 2021 (DE) .......................... 102021113035.2

(51) Int. Cl.
*A01F 12/60* (2006.01)
*A01D 41/12* (2006.01)
(52) U.S. Cl.
CPC .......... *A01D 41/1226* (2013.01); *A01F 12/60* (2013.01)
(58) Field of Classification Search
CPC ............ A01D 41/1208; A01D 41/1226; A01D 41/1261; A01D 41/1217; A01D 41/00–41/16; A01F 12/60
See application file for complete search history.

(56) References Cited

U.S. PATENT DOCUMENTS

| 4,457,444 A * | 7/1984 | Wold ................... B65D 88/126 49/40 |
| 6,102,795 A * | 8/2000 | Behrens ............. A01D 41/1208 460/119 |
| 6,206,779 B1 * | 3/2001 | Gerber ............... A01D 41/1226 56/28 |
| 6,508,705 B1 * | 1/2003 | Van Overschelde ........................ A01D 41/1226 460/119 |
| 7,585,214 B1 * | 9/2009 | Johnson ............. A01D 41/1226 460/119 |
| 8,113,565 B2 | 2/2012 | Zeuner et al. |
| 9,089,090 B2 * | 7/2015 | Claes ................. A01D 41/1226 |
| 9,826,681 B2 | 11/2017 | Claes et al. |
| 9,955,630 B2 | 5/2018 | Steen |
| 10,155,550 B2 * | 12/2018 | Claerhout .............. B62D 33/08 |
| 11,284,564 B2 | 3/2022 | Bormann et al. |

(Continued)

FOREIGN PATENT DOCUMENTS

| CA | 2400278 A1 | 4/2003 |
| CN | 112753356 A * | 5/2021 ......... A01D 41/1208 |
| JP | 2019004784 A | 1/2019 |

OTHER PUBLICATIONS

European Search Report for European patent application No. 22155901.6-1105 mailed Jul. 11, 2022.

*Primary Examiner* — Joseph M Rocca
*Assistant Examiner* — Madeline I Runco
(74) *Attorney, Agent, or Firm* — Lempia Summerfield Katz LLC (57) ABSTRACT

A harvested material tank of a harvester is disclosed. The harvested material tank comprises a tank expansion formed from a plurality of movable elements. At least one of the plurality of movable elements includes at least one access flap that, when in an open position, offers access for a user to the interior of the harvested material tank.

19 Claims, 6 Drawing Sheets

(56) References Cited

U.S. PATENT DOCUMENTS

| | | | |
|---|---|---|---|
| 2003/0078085 A1 | 4/2003 | Gerber et al. | |
| 2004/0033823 A1* | 2/2004 | Stephens | B60J 7/102 |
| | | | 460/119 |
| 2004/0254003 A1* | 12/2004 | Colpaert | A01D 41/1226 |
| | | | 460/119 |
| 2011/0049927 A1* | 3/2011 | Horst | A01D 41/1226 |
| | | | 296/100.18 |
| 2013/0296005 A1* | 11/2013 | Claes | A01D 41/1226 |
| | | | 460/119 |
| 2014/0274237 A1* | 9/2014 | Tippery | A01D 41/1208 |
| | | | 460/119 |
| 2017/0142899 A1* | 5/2017 | Matousek | A01D 41/1208 |
| 2018/0215421 A1* | 8/2018 | Claerhout | B62D 25/10 |
| 2020/0340285 A1 | 10/2020 | Mussack et al. | |
| 2021/0178973 A1* | 6/2021 | Moen | B60R 3/02 |
| 2023/0054592 A1* | 2/2023 | Mainero | B60P 1/40 |

* cited by examiner

HARVESTER WITH TANK EXPANSION

CROSS REFERENCE TO RELATED APPLICATION

This application claims priority under 35 U.S.C. § 119 to German Patent Application No. DE 102021113035.2 filed May 19, 2021, the entire disclosure of which is hereby incorporated by reference herein.

TECHNICAL FIELD

The invention relates to a harvester, such as a combine, whose harvested material tank comprises a tank expansion comprising (or consisting of) a plurality of movable elements.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

A combine is disclosed in U.S. Pat. No. 8,113,565, incorporated by reference herein in its entirety. The harvested material tank of the combine disclosed in U.S. Pat. No. 8,113,565 comprises a rigid-walled bottom part that is incorporated in the body of the combine, and a tank expansion comprises several plate-shaped elements that are pivotable about axes running along a top edge of the bottom part between a resting position covering the bottom part and an upright operating position.

In order to be able to perform servicing tasks in the interior of the grain tank of a combine, JP2019004784 proposes providing a flap in a sidewall of the body of the combine that a user may open to enter into the grain tank.

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

As discussed above, JP2019004784 proposes providing a flap in a sidewall of the body of the combine that a user may open to enter into the grain tank. However, it is very difficult and uncomfortable to climb through such a flap when the small size of the flap forces one to climb through on all fours. Further, there is no suitable base in front of and behind the flap offering support to one's hands and knees.

Thus, in one or some embodiments, a harvester is disclosed that is configured for a user to easily and comfortably enter the harvested material tank.

In one or some embodiments, a harvester is disclosed with a harvested material tank that comprises a tank expansion, with the tank expansion comprising (or consisting of) a plurality of movable elements. Further, one or more of the plurality of movable elements are assigned or configured to have at least one access flap that, when in an open position, offers access for a user to the interior of the harvested material tank in the harvester. For example, in the open position, the at least one access flap results in an opening for access to an interior of the harvested material tank, with the opening sized for a user to enter the interior of the harvested material tank (e.g., such that the user may enter while upright). In one or some embodiments, a top side of the body of the harvester may serve as a base of support that bears the weight of the user when the user is proximate to the access flap. In this regard, the user may position himself or herself by standing on the top side of the body of the harvester as the user steps into the interior of the harvested material tank.

When in a closed position, the access flap is configured to close a passage (e.g., into or out of the harvested material tank) in a respective one of the one or more movable elements.

In one or some embodiments, the access flap is located or positioned within the harvested material tank when in the open position. For example, the access flap may include one or more hinges (e.g., hinged on one side of the access flap) such that the access flap swings inward (e.g., into the interior of the harvested material tank) in the open position. Because the access flap opens into the inside of the harvested material tank, this may ensure that the access flap is blocked by the harvested material tank's content when harvested material tank is full (such as completely full). This may prevent harvested material tank contents from discharging when the access flap is opened at the wrong time.

In one or some embodiments, the passage may comprise a cutout in the tank expansion that is open at the top. This allows the user to climb in and out of the harvested material tank in an upright body posture (e.g., in the open position, the opening has at least one side that is unbounded such that the user may walk upright into the interior of the harvested material tank).

In one or some embodiments, the cutout is formed in just one of the movable elements, and parts of the movable element lying on different sides (e.g., on opposite sides) of the cutout are connected to each other so as not to rotate. Accordingly, the parts of the movable element that lie on different sides (e.g., on opposite sides) of the cutout cannot pivot independent of each other, which may be important for the mechanical stability of the tank expansion.

In one or some embodiments, the access flap may have a reinforcing profile extending along at least one edge, such as its top edge, in order to withstand the pressure of harvested material in the tank without any significant sag. Similar reinforcement profiles may also be provided on the movable elements so that when the access flap is in the closed position, reinforcement profiles bordering the reinforcement profile of the access flap fill a gap between the reinforcement profiles of the movable elements (e.g., reinforcement profiles on the movable elements on opposite sides of the movable element with the access flap).

In one or some embodiments, in order to be able to reliably withstand the pressure of the tank contents, the reinforcement profile of the access flap may engage with at least one reinforcement profile of the movable elements acting as a reinforcing structure so as to withstand tensile stress in its longitudinal direction. If the access flap is pivotable about its lateral axis, a hinge on this side may then form a connection resistant to tensile stress between the access flap and an adjacent region of the movable element, and it is enough if the reinforcement profile engages with the opposite side in a manner that may withstand tensile stress. A pivot axis of the flap may also run along its bottom edge facing away from the reinforcement profile. In this case, the engagement withstanding tensile stress may be on both ends of the reinforcement profile of the flap.

In one or some embodiments, one or more structures may be included to fix or maintain the access flap in the open position (e.g., swung around 90°) relative to the closed position. When the access flap is fixed in this way, its reinforcement profile may function as a type of handle or railing that makes it easier for the user to enter and/or exit the harvested material tank.

In one or some embodiments, the movable elements may pivot about a horizontal axis between a resting position in which they cover a bottom part of the harvested material tank, into a service position in which they diverge upward from the horizontal axes. This oblique position of the movable element may make it exceedingly difficult to climb over the movable elements, so that the access flap according to one aspect the invention may be particularly advantageous.

Generally speaking, the larger the movable elements, the more difficult it may be to climb over them. Consequently, in one or some embodiments, the access flap may be highly effective with movable elements that are large enough for pairs of the movable elements that oppose each other on both sides of the tank expansion in the service position to at least partially overlap in the resting position.

In one or some embodiments, to make it possible for a user to climb into a bottom part of the harvested material tank, a ladder is included. Such a ladder may be mounted in the bottom of the harvested material tank leading toward the access flap (such that a top of the ladder may be positioned near the access flap).

According to an alternative embodiment, the ladder may also be integrated in the access flap. In one particular embodiment whereby the access flap is pivotable about an axis running along its bottom edge, the ladder may be positioned on the side of the access flap to the outside in the closed position, and assumes a position by opening and swinging in the access flap in which the ladder extends into the bottom part of the tank and thereby may be used.

Figure 1:
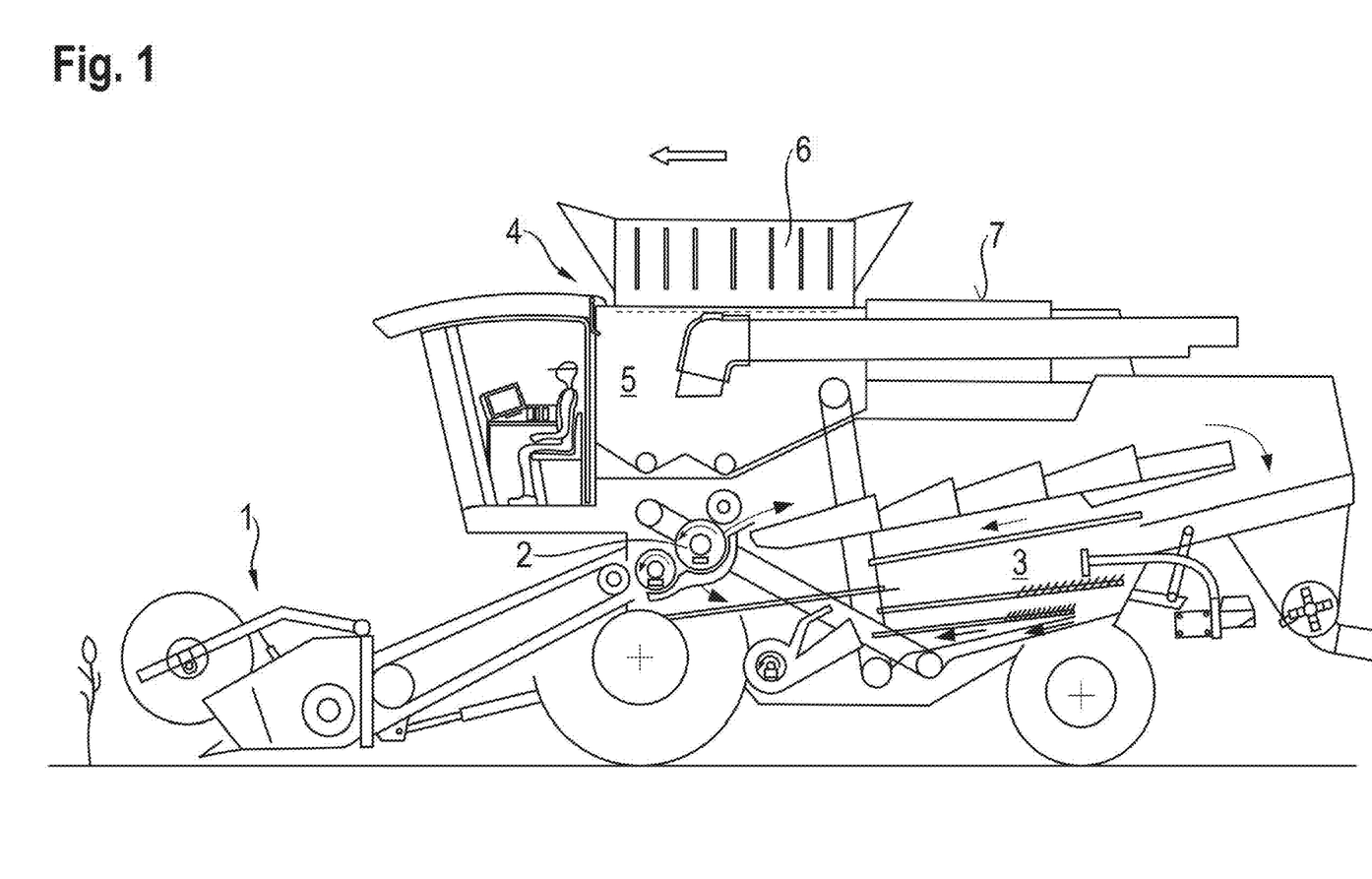
FIG. 1 shows a side view of a combine.

Referring to the figures, FIG. 1 illustrates a combine as an example of a harvester partially in a side view and partially in a section. Various types of harvesters are contemplated, with the disclosed combine being one example of such. One example combine is disclosed in U.S. Pat. No. 11,284,564, incorporated by reference herein in its entirety. Harvesting header 1, threshing unit 2, and cleaning unit 3 of the combine are of a familiar design to those of skill in the art and do not need to be described further. A harvested material tank 4 that receives the threshed and cleaned grain comprises a bottom part 5 that may, in one embodiment, be incorporated at least partly (or entirely) within a body of the combine, and a tank expansion 6 that extends above a top side 7 of the body of the combine in its service position as shown in the figure.

In one or some embodiments, side walls of the tank expansion 6 may be formed by a plurality of rigid, plate-like movable elements 8-11 (visible in FIGS. 2 and 3), with one, some or each of the movable elements 8-11 being pivotably connected to the body (e.g., the body of the combine) about axes running along their bottom edges at the height of the top side 7. Further, in one or some embodiments, the movable elements 8-11 may oppose each other in pairs. In one particular embodiment as shown in the figures, the movable elements 8, 9 of a pair are trapezoidal, wherein the longer of the two baselines of the trapezoid form the bottom edge of the movable element 8 and 9. The movable elements 10, 11 of another pair are rectangular. Various shapes and numbers of pairs of movable elements 8-11 are contemplated. In one or some embodiments, gaps between an oblique side of one of the movable elements 8, 9 and a shorter side of one of the movable elements 10, 11 are filled by flexible triangular tarpaulins 12 (or other shaped flexible material) which are each foldably connected along the edges 13 to the adjacent, movable elements 8-11. This design may allow for the tank expansion 6 to enter into a resting configuration by swinging the movable elements 8-11 relative to each other into a horizontal position in which they close at least a part of an opening in the bottom part 5 at the top, and in one or some embodiments, the opposing, movable elements 8 and 9 and/or 10 and 11 in the folded position may at least partly overlap each other.

Figure 2:
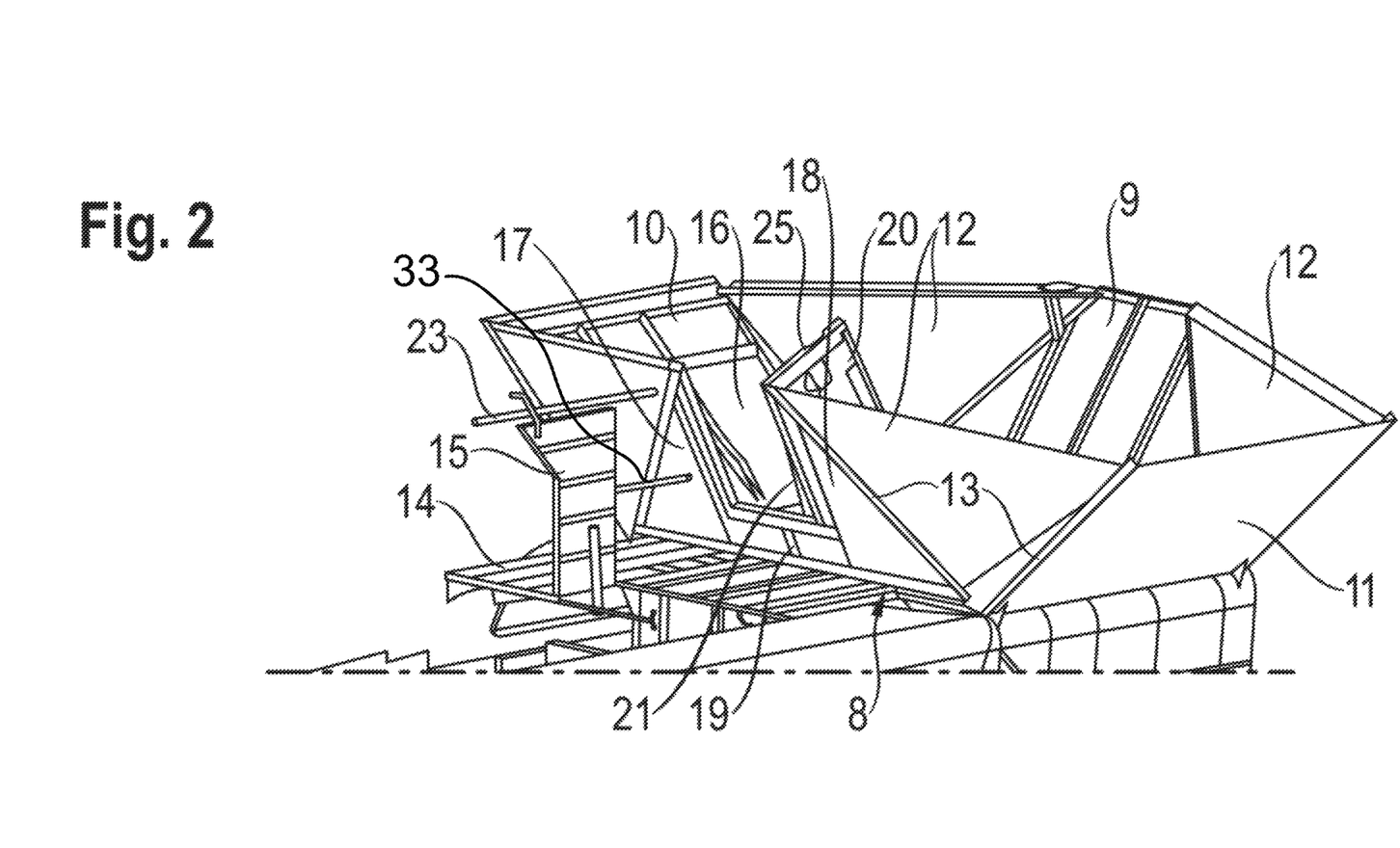
FIG. 2 shows a perspective outside view of a tank expansion of the combine.
Figure 3:
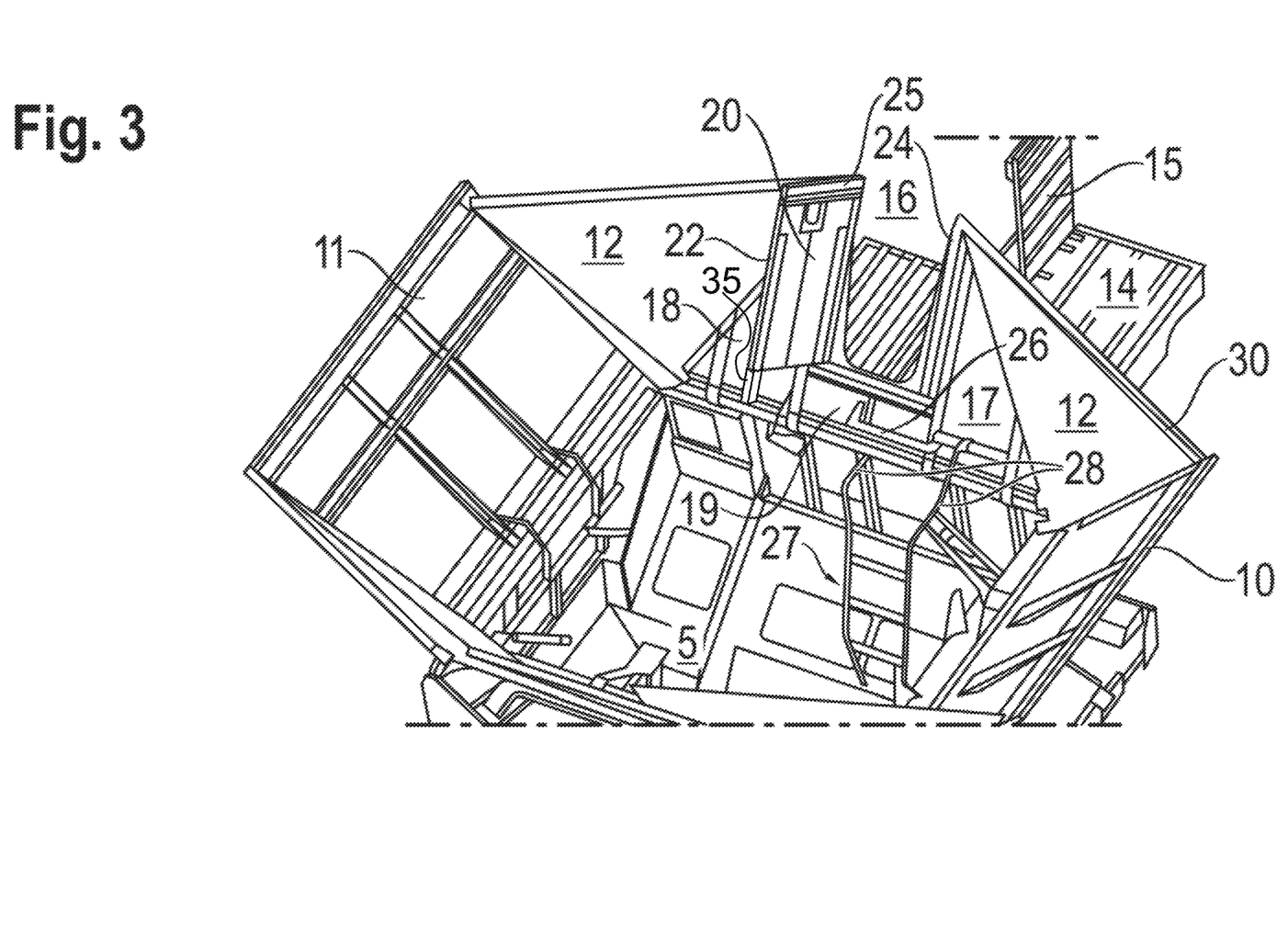
FIG. 3 shows a perspective interior view of the tank expansion.

In one or some embodiments, the top side 7 comprises an accessible area 14 (e.g., a user-accessible area) and an element 15 that is pivotable between a position flush with the accessible area and an upright position shown in FIGS. 2 and 3. In the upright position, the element 15 may be locked to provide support for a user on the accessible area 14. See bracket 33 to which element 15 may be reversibly connected to in the upright position.

In one or some embodiments, a cutout 16 (which is one example of an opening for access into the interior of the harvested material tank 4) open at the top is formed in the movable element 8 bordering the accessible area 14. In one or some embodiments, parts 17, 18 on opposite sides of the cutout 16 are securely connected to each other by a bar 19 running below the cutout 16. An access flap 20 is articulated to the part 18 along a lateral edge 21 of the cutout 16. FIGS. 2 and 3 show the access flap 20 in an open position swung about 90° relative to the plane of the movable element 8. In one or some embodiments, the access flap 20 may be fixed in the open position using one or more structures. Example structures may comprise a bracket 35 or the like that may be reversibly connected to the access flap 20 to fix the access flap 20 in the open position. Other means are contemplated.

Figure 4:
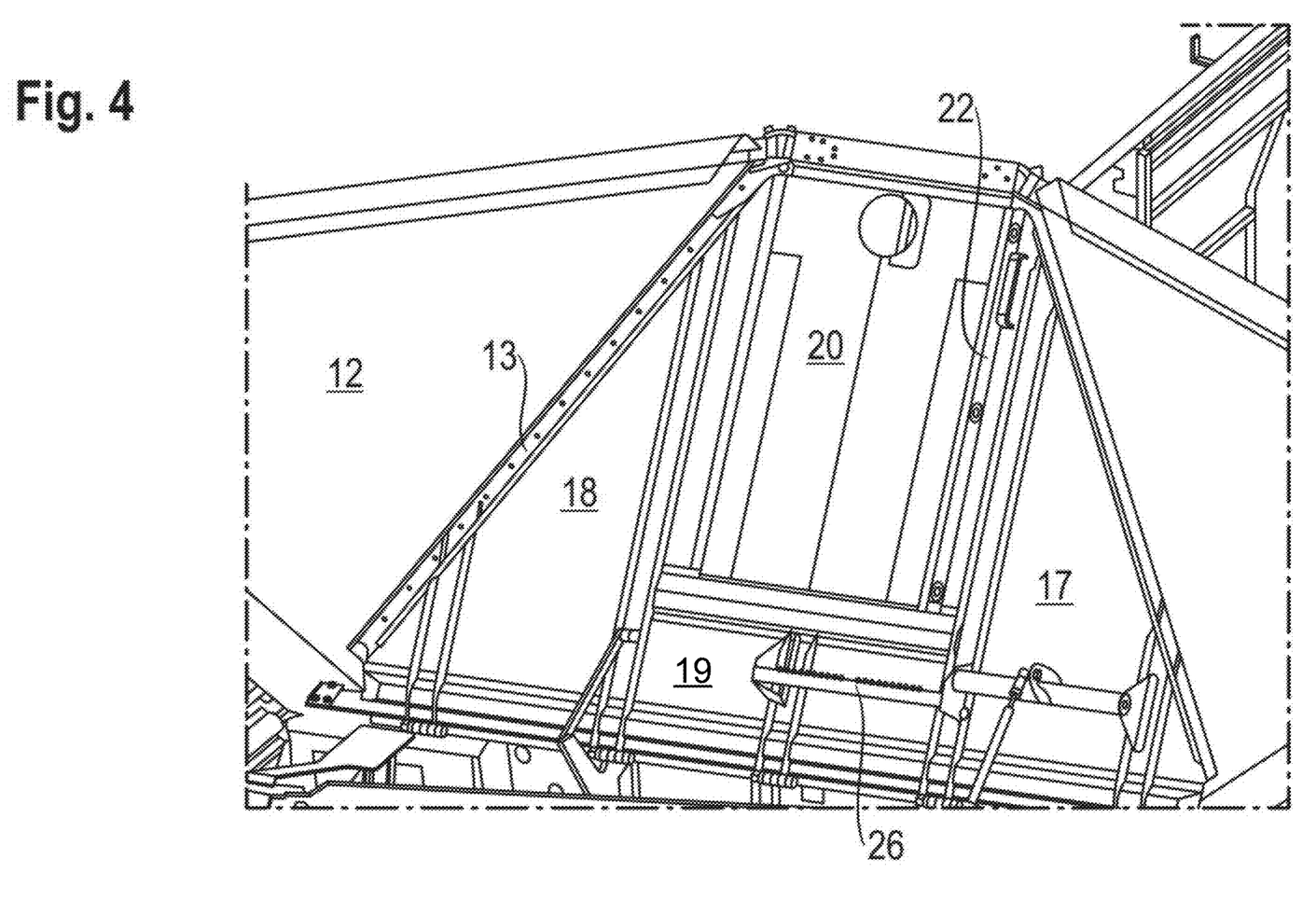
FIG. 4 shows a detailed view of the tank expansion when the access flap is closed.

FIG. 4 illustrates a closed position of the access flap 20. In the closed position, a lateral edge area 22 of the access flap 20 lies on an edge bar 24 (see FIG. 3) of the part 17. In one or some embodiments, the access flap 20 may be swung out of the closed position only into the interior of the tank expansion 6; as such, in this embodiment, the access flap 20 cannot spring open under the pressure of harvested material lying on top of it. Thus, in one or some embodiments, the edge bar 24 may be configured to prevent the access flap 20 to swing open such that the access flap 20 swings to the exterior of the tank expansion 6.

When the access flap 20 is in the open position, a user may pass through the cutout 16 in an upright body posture (e.g., walking without requiring to crouch down). A handle 23 on the top edge of the element 15 may offer support for the user on the way to and/or through the cutout 16; behind the cutout 16, the user may grasp a reinforcing profile 25 like a railing forming a top edge of the access flap 20.

In one or some embodiments, on the inside of the bar 19, there is a first step 26 on which the user may step after passing through the cutout. A ladder 27 extends under this that allows the user to climb down into the bottom part 5 of the harvested material tank 4. The top ends 28 of the ladder 27 may be fastened to a wall of the bottom part 5; the ladder 27 therefore may remain in place (e.g., not move) when the tank expansion 6 is switched to the resting position (e.g., one, some or all of the swinging the movable elements 8-11 relative to each other are in a horizontal position).

Figure 5:
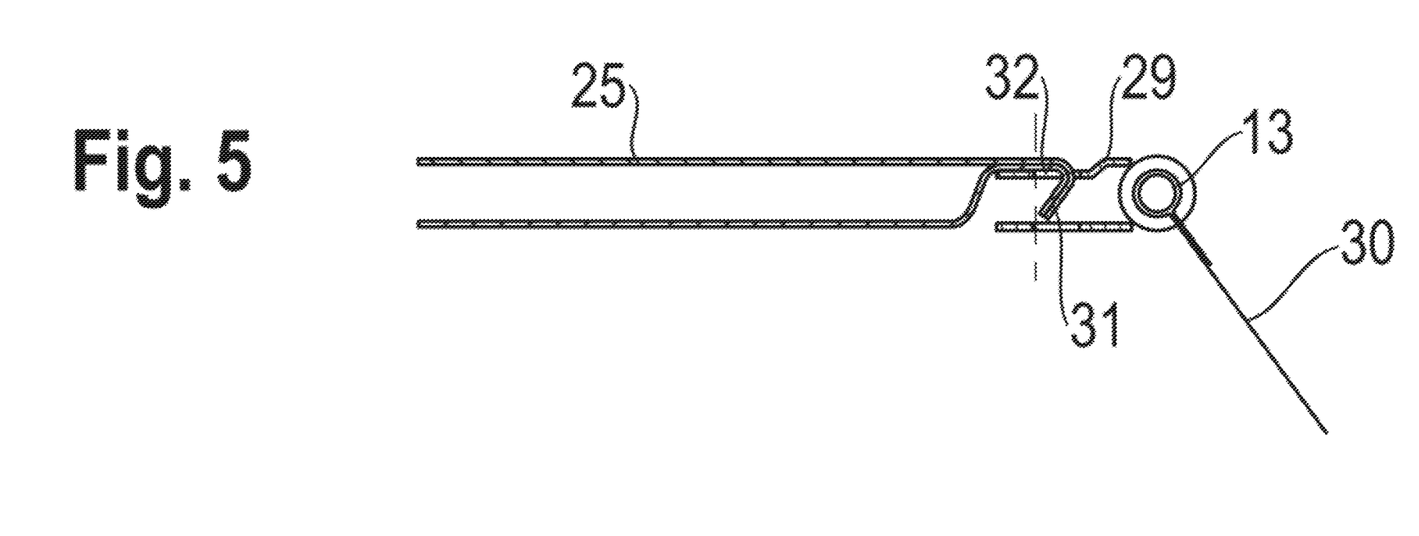
FIG. 5 shows a schematic longitudinal section of reinforcement profiles of the access flap and a movable element accommodating the access flap.

FIG. 5 illustrates a schematic longitudinal section of the reinforcing profile 25, a reinforcing profile 29 adjacent thereto of the movable element 8, and a stretch-resistant belt 30 that forms a top edge of a triangular tarpaulin 12 adjacent thereto. In one or some embodiments, the reinforcing profile 29 and the belt 30 form a continuous frame, together with reinforcing profiles of the other movable elements 9-11 and belts of the other tarpaulins 12, that extends up to the hinge on the lateral edge 21, and an end of the reinforcing profile 25 close to the hinge that is not shown in FIG. 5. A barb 31 may be formed at an end of the reinforcing profile 25 distant or opposite from the hinge. In a closed but unloaded state of the access flap 20, the barb 31 may freely engage in a hole 32 as shown, or a cutout in the reinforcing profile 29, and may exit it unhindered when the access flap 20 is opened. In the event that the movable elements 8-11 are pushed apart by the weight of harvested material in the tank expansion 6, the reinforcing profiles 25, 29 may also be pulled apart longitudinally. In this case, the barb 31 grips behind an edge of the hole 32 or in an undercut of the cutout. Accordingly, the reinforcing profile 25 on the one hand may prevent the movable element 8 weakened by the cutout 16 from bending under the load of the tank content and its parts 17, 18 from being pulled apart; on the other hand, the reinforcing profile 25 may advantageously make it more difficult to open the access flap 20 when the tank expansion 6 is not empty.

Figure 6:
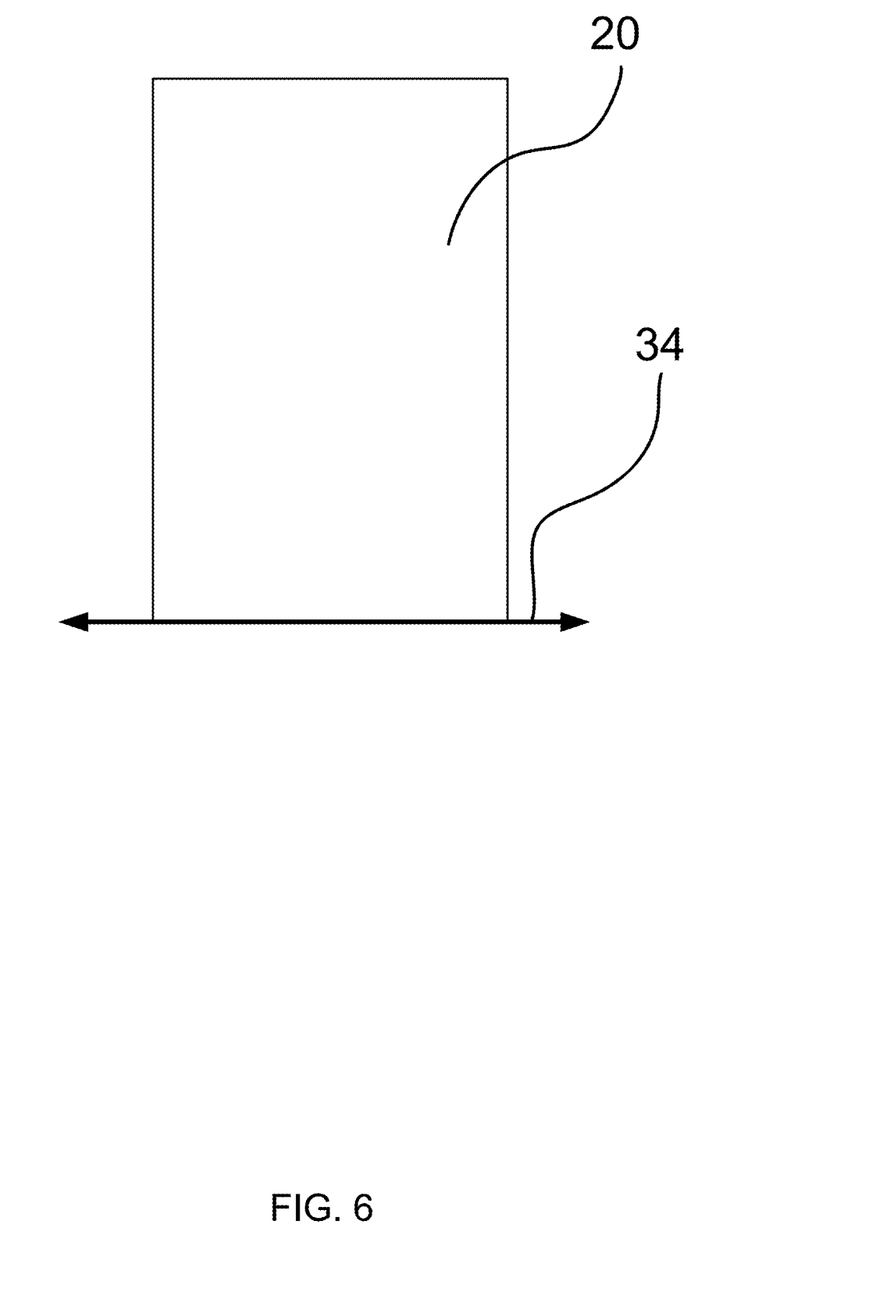
FIG. 6 shows the access flap as pivotable about an axis running along its bottom edge.

According to an alternative shown in FIG. 6, the access flap 20 is not pivotable about a side axis but rather about an axis running along its bottom edge. In this case, there is no step 26; instead, a part of the access flap 20 close to the axis comes to rest on the inside of the bar 19 when in the open position; a part remote from the axis extends beyond the bar 19 into the bottom part 5 of the harvested material tank 4. On the side of the access flap 20 at the top when in the open position, steps may be provided that make it possible for the user to easily climb down into the bottom part 5.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another.

REFERENCE NUMBERS

1 Harvesting header
2 Threshing unit
3 Cleaning unit
4 Harvested material tank
5 Bottom part
6 Tank expansion
7 Top side
8 (Trapezoidal) movable element
9 (Trapezoidal) movable element
10 (Rectangular) movable element
11 (Rectangular) movable element
12 Tarpaulin
13 Edge
14 Accessible area
15 Pivotable element
16 Cutout
17 Part (of the movable element 8)
18 Part (of the movable element 8)
19 Bar
20 Access flap
21 Side edge
22 Side edge area
23 Handle
24 Edge bar
25 Reinforcing profile (of the access flap 20)
26 Step
27 Ladder
28 Top end
29 Reinforcing profile
30 Belt
31 Barb
32 Hole
33 Bracket
34 Axis
35 Bracket

The invention claimed is:

1. A harvester comprising:
a harvested material tank that comprises a tank expansion formed from side walls, each of the side walls in the tank expansion consisting of rigid movable elements;
wherein at least one of the side walls that consist of the rigid movable elements comprises at least one access flap that, when in an open position, results in an opening for access to an interior of the harvested material tank, with the opening sized for a user to enter the interior of the harvested material tank;
wherein, when in a closed position, the at least one access flap closes the opening for at least one element; and
wherein, when in the open position, the at least one access flap is positioned within the harvested material tank.

2. The harvester of claim 1, wherein the opening comprises a cutout in the tank expansion that is open at a top.

3. The harvester of claim 2, wherein the cutout is formed in just one of the side walls; and
wherein at least two of the side walls positioned on opposite sides of the cutout are connected to each other so as not to rotate independently of each other.

4. The harvester of claim 3, wherein the at least two of the side walls positioned on opposite sides of the cutout are connected to each other by a bar running below the cutout.

5. The harvester of claim 2, wherein the cutout is sized such that the user may enter while upright.

6. The harvester of claim 2, wherein the at least one access flap comprises at least one reinforcing profile extending along at least a part of a top edge of the at least one access flap such that, when the at least one access flap is in the closed position, fills a gap between at least one reinforcing profile of an adjacent movable element.

7. The harvester of claim 6, wherein, when in the closed position, the at least one reinforcing profile of the at least one access flap is engaged with the at least one reinforcing profile of the adjacent movable element thereby providing a reinforcing structure to withstand tensile stress in its longitudinal direction; and wherein a stretch-resistant belt forms a top edge of a shaped flexible material adjacent to the at least one access flap.

8. The harvester of claim 7, wherein each of the side walls includes the at least one reinforcing profile;
wherein the harvested material tank comprises a plurality of shaped flexible materials each with a stretch-resistant belt; and
wherein the reinforcing profiles and the stretch-resistant belts form a continuous frame that extends up to a hinge on a side edge of the cutout, and an end of the at least one reinforcing profile of the at least one access flap.

9. The harvester of claim 6, further comprising a means to affix the at least one access flap in the open position.

10. The harvester of claim 6, wherein the harvester comprises a top side that includes a user-accessible area and an element that is pivotable between a position flush with the user-accessible area and an upright position; and
wherein the element in the upright position is configured to offer support for the user into the opening.

11. The harvester of claim 1,
wherein the at least one access flap comprises at least one reinforcing profile extending along at least a part of a top edge of the at least one access flap; and
wherein the at least one reinforcing profile of the at least one access flap in the open position is further configured to function as a railing for the user.

12. The harvester of claim 1,
wherein in the closed position, the at least one access flap lies on an edge bar; and
wherein the edge bar is configured to prevent the at least one access flap from swinging to an exterior of the tank expansion.

13. The harvester of claim 1, wherein the side walls are configured to pivot about horizontal axes between a resting position in which the side walls cover at least a part of a bottom part of the harvested material tank into a service position in which the side walls diverge upward from the horizontal axes.

14. The harvester of claim 13, wherein at least one pair of the side walls that oppose each other in the service position on both sides of the tank expansion at least partially overlap in the resting position.

15. The harvester of claim 14, wherein the tank expansion is further formed from one or more tarpaulins; and
wherein the one or more tarpaulins are connected along edges to the side walls.

16. The harvester of claim 15, wherein the one or more tarpaulins are formed between an oblique side of one side wall and a shorter side of another side wall.

17. The harvester of claim 1, further comprising a ladder positioned within the harvested material tank and extending downward toward a bottom part of the harvested material tank.

18. The harvester of claim 17, wherein the ladder that is mounted in the bottom part of the harvested material tank leading to the at least one access flap.

19. The harvester of claim 1, wherein the at least one access flap is hinged on one side of the access flap so as to swing inward into an interior of the harvested material tank.

* * * * *